(12) United States Patent
Javaudin (10) Patent No.: US 8,503,566 B2
(45) Date of Patent: Aug. 6, 2013

(54) METHOD OF TRANSMITTING MULTI-CARRIER SIGNALS IN A MULTI-ANTENNA SYSTEM

(75) Inventor: Jean-Philippe Javaudin, Rennes (FR)

(73) Assignee: France Telecom, Paris (FR)

( * ) Notice: Subject to any disclaimer, the term of this patent is extended or adjusted under 35 U.S.C. 154(b) by 304 days.

(21) Appl. No.: 12/919,105

(22) PCT Filed: Feb. 27, 2009

(86) PCT No.: PCT/FR2009/050316
§ 371 (c)(1),
(2), (4) Date: Aug. 24, 2010

(87) PCT Pub. No.: WO2009/112773
PCT Pub. Date: Sep. 17, 2009

(65) Prior Publication Data
US 2011/0002408 A1  Jan. 6, 2011

(30) Foreign Application Priority Data
Feb. 29, 2008 (FR) .................................. 08 51334

(51) Int. Cl.
*H04B 7/02* (2006.01)
(52) U.S. Cl.
USPC ............................... 375/267; 375/261
(58) Field of Classification Search
None
See application file for complete search history.

(56) References Cited

U.S. PATENT DOCUMENTS

| | | |
|---|---|---|
| 2003/0086479 A1 | 5/2003 | Naguib |
| 2004/0001429 A1* | 1/2004 | Ma et al. ................. 370/210 |
| 2004/0062191 A1* | 4/2004 | Lacroix-Penther et al. .. 370/206 |
| 2009/0161605 A1* | 6/2009 | Shen et al. ................ 370/328 |

OTHER PUBLICATIONS

El Tabach et al., "Spatial Data Multiplexing over OFDM/OQAM Modulations," IEEE International Conference on Communications, 2007-ICC'07, pp. 4201-4206 (Jun. 24-28, 2007).
Kuhn et al., "Linear Scalable Space-Time Codes: Tradeoff Between Spatial Multiplexing and Transit Diversity," $4^{th}$ IEEE Workshop on Signal Processing Advances in Wireless Communications—SPAWC 2003, NJ, USA, pp. 21-25 (Jun. 15-18, 2003).

(Continued)

*Primary Examiner* — Leon-Viet Nguyen
(74) *Attorney, Agent, or Firm* — Drinker Biddle & Reath LLP (57) ABSTRACT

The present invention relates to a method of transmitting a multi-carrier signal intended to be used by a system with Nt transmit antennas, where Nt is greater than or equal to two, and Nr receive antennas, where Nr is greater than or equal to one, of the type using OFDM/OQAM modulation and distributing symbols before transmission in a time-frequency plane, in which method the symbols are distributed over blocks of particular size $n_t.n_f$ where $n_t \geq 3$ and $n_f \geq 3$. The method comprises real type space-time block coding by a space-time coder of blocks using a coding matrix of particular size NtxN and of particular efficiency Nc/N to generate Nt coded sequences of N blocks of symbols of an input sequence of Nc blocks of symbols.

16 Claims, 6 Drawing Sheets

OTHER PUBLICATIONS

Kuo et al., "Robust Video Transmission over Wideband Wireless Channel Using Space-Time Coded OFDM Systems," Conference Proceedings of IEEE Wireless Communications and Networking Conference 2002—WCNC2002, NJ, USA, pp. 931-936 (Mar. 17, 2002).

Sabir et al., "An Unequal Error Protection Scheme for Multiple Input Multiple Output Systems," Conference Record of the 36$^{th}$ Asilomar Conference on Signals, Systems & Computers 2002, NY, US, vol. 1, pp. 575-579 (Nov. 3-6, 2002).

Wang et al. "An Adaptive UEP_BTC_STBC_OFDM System for Robust Video Transmission," IEEE 7$^{th}$ Workshop on Multimedia Signal Processing 2005, pp. 1-4 (Oct. 1, 2005).

Zhong et al., "Full-Rate Orthogonal Space-Time Block Code With Pulse-Shaped Offset QAM for Four Transmit Antennas," IEEE Transactions on Wireless Communications, NJ, US, vol. 6(4), pp. 1551-1559 (Apr. 1, 2007).

* cited by examiner

METHOD OF TRANSMITTING MULTI-CARRIER SIGNALS IN A MULTI-ANTENNA SYSTEM

CROSS-REFERENCE TO RELATED APPLICATIONS

This application is the U.S. national phase of the International Patent Application No. PCT/FR2009/050316 filed Feb. 27, 2009, which claims the benefit of French Application No. 08 51334 filed Feb. 29, 2008, the entire content of which is incorporated herein by reference.

FIELD OF THE INVENTION

The present invention relates to the field of telecommunications. Within that field, the invention relates more particularly to what is called digital communications. Digital communications include wireless communication by radio and communication via cable. The communication transmission medium is commonly called the transmission or propagation channel, originally with reference to an aerial channel and by extension to any channel.

The invention relates to transmission and reception in a multi-antenna system, in particular a system of the MIMO (Multiple Input Multiple Output) or MISO (Multiple Input Single Output) type using a precoding matrix [using multiple carriers]. In a system with multiple transmit or receive antennas, there are as many transmission channels as there are transmit-receive antenna pairs. The invention applies to multi-antenna multi-carrier systems employing at least two transmit antennas and at least one receive antenna, whether for broadcasting information or for communication.

The invention may be applied to uplink communication (from a terminal to a base station) and to downlink communication (from a base station to a terminal).

One example of an application of the invention is the field of fixed or mobile radio communications, especially for DVB-T systems and for fourth generation and beyond systems, typically called B3G (Beyond 3rd Generation) systems. These systems include MC-CDMA (Multi-Carrier Coded Division Multiple Access) systems and OFDMA (Orthogonal Frequency Division Multiple Access) systems with an MIMO type downlink or uplink transmission scheme in which data to be transmitted is divided into time-frequency frames. The invention applies in particular to any type of system using OFDM modulation, for example OFDMA, LP-OFDM or IFDMA modulation.

The invention relates more particularly to a technique for transmitting and a technique for receiving a multi-carrier OFDM signal enabling optimum use of spatial diversity and the transmission capacity of a multi-antenna system.

BACKGROUND

Several types of OFDM multi-carrier modulation are known at this time.

Of these, the nearest to a standard modulation technique includes a particularly simple equalization system based on inserting a guard time. This guard time, also called a cyclic prefix, provides good performance in the face of echoes at the price of a loss of spectral efficiency.

As a matter of fact, to guarantee that all information received comes from the same multi-carrier symbol, no payload information is transmitted during the guard time. This is an effective way to combat echo phenomena caused both by the Doppler effect and by multiple propagation paths resulting in intersymbol interference (ISI) in the receiver.

In a system with a plurality of transmit antennas, the interference observed in the receiver originates from the presence of a plurality of signals transmitted simultaneously by the various transmit antennas, which causes what is called interantenna interference or spatial interference.

Figure 1:
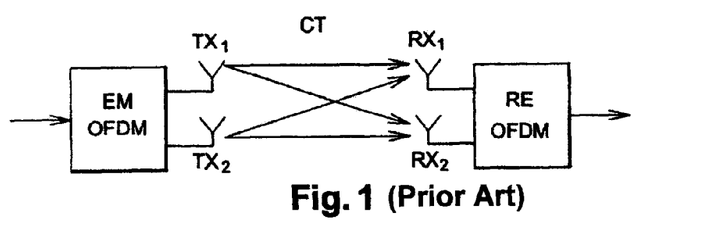
FIG. 1 is a diagram showing a prior art communications system.

Transmit/receive systems comprising multiple antennas are already well known. One such system is represented diagrammatically in FIG. 1. The system includes a transmitter EM, at least two transmit antennas $TX_1$, $TX_2$, one or more receive antennas $RX_1$, $RX_2$, and a receiver RE. The signals radiated by a transmit antenna are transmitted to the receive antennas via the propagation channel CT. By way of simplification, the propagation channel often includes the transmit and receive antennas. Some of these systems employ spatial coding, space-time coding or space-frequency coding associated with multi-carrier modulation, in particular OFDM modulation, making it possible to exploit the space-time diversity of these systems.

The first systems proposed all employed orthogonal space-time block codes. Alamouti, in "A Simple Transmit Diversity Technique for Wireless Communications", IEEE J. Sel. Areas Comm., 1998, 16, (8), pp. 1451-1458, describes the first system employing, for two transmit antennas, an orthogonal space-time block code with an efficiency of 1 (where the efficiency is defined as the ratio between the number N of different data symbols transmitted and the number L of multi-carrier symbol times during which they are transmitted). The term data symbol commonly refers to the output of a converter module that formats the information to be transmitted according to a given constellation (QPSK, QAM, etc.). A multi-carrier symbol represents a multiplex produced by a multi-carrier multiplexer, commonly referred to as an OFDM multiplex, which entails distributing the data symbols between the sub-carriers of the multiplex and summing the data symbols weighted by Fourier coefficients. This weighted summation is effected by means of an inverse Fourier transform. It is routine for some sub-carriers to be reserved for particular symbols such as pilot symbols. In the remainder of this document the term symbol refers to various types of symbols and in particular to data symbols and pilot symbols.

With OFDM modulation, it is commonly assumed that the channel on each sub-carrier is flat. Ignoring the introduction of noise, this amounts to assuming that the effect of the propagation channel is reflected in each symbol transmitted on a sub-carrier, with a given OFDM symbol time, by multiplication by a single complex coefficient.

Figure 2:
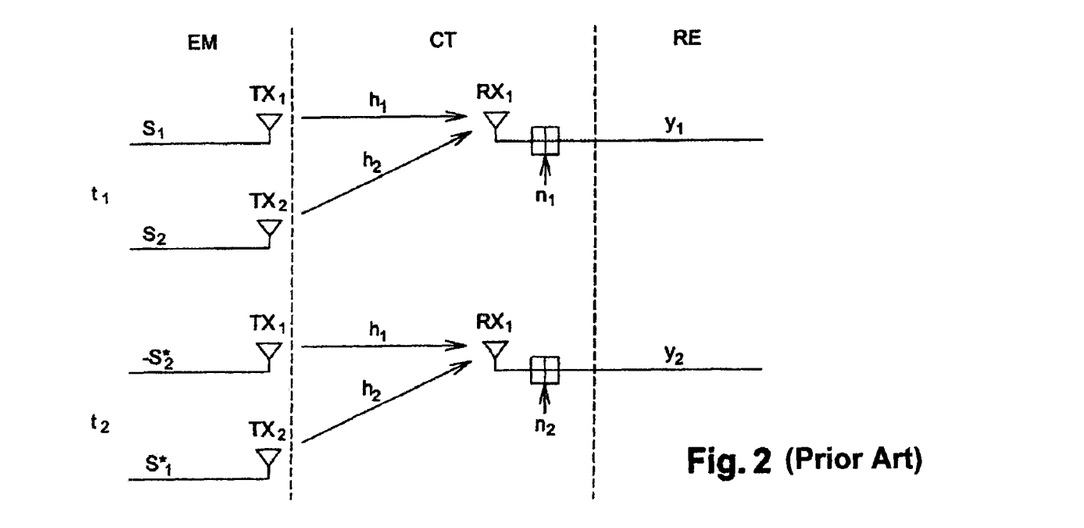
FIG. 2 shows a known space-time coding scheme of the Alamouti type.

FIG. 2 illustrates space-time coding in accordance with an Alamouti scheme for two transmit antennas $TX_1$, $TX_2$ and one receive antenna $RX_1$. In this situation, Q=2 independent symbols $S_1$, $S_2$ are coded during a time period equal to two OFDM symbol times.

The principle of what is proposed by S. Alamouti is to create a coding scheme ensuring decoupling of the transmitted symbols on reception and thus enabling linear maximum likelihood decoding. The coding orthogonal pattern is expressed by the following matrix C:

$$C = \begin{pmatrix} s_1 & s_2 \\ -s_2^* & s_1^* \end{pmatrix} \quad (1)$$

Referring to FIG. 2, and assuming that the channel does not vary over at least one OFDM symbol time, the equations at the input of the receiver are:

$$\text{at time } t_1: y_1 = h_1 s_1 + h_2 s_2 + n_1 \qquad (2)$$

$$\text{at time } t_2: y_2 = -h_1 s^*_2 + h_2 s^*_1 + n_2 \qquad (3)$$

where $t_2 = t_1 + T$, T being the OFDM symbol time, $n_1$, $n_2$ is the noise introduced by the propagation channel CT at times $t_1$ and $t_2$, respectively, and $h_1$, $h_2$ are the respective coefficients of the propagation sub-channels from the transmit antennas $TX_1$ and $TX_2$ to the receive antenna $RX_1$, assumed to be constant over at least the OFDM symbol time T.

These equations may be expressed in matrix form:

$$\begin{pmatrix} y_1 \\ y_2 \end{pmatrix} = \begin{pmatrix} s_1 & s_2 \\ -s^*_2 & s^*_1 \end{pmatrix} \begin{pmatrix} h_1 \\ h_2 \end{pmatrix} + \begin{pmatrix} n_1 \\ n_2 \end{pmatrix} = C\vec{h} + \vec{b} \qquad (4)$$

with:

$$\vec{h} = \begin{pmatrix} h_1 \\ h_2 \end{pmatrix}, \text{ and } \vec{b} = \begin{pmatrix} n_1 \\ n_2 \end{pmatrix}$$

The matrix of the code C satisfies the following orthogonality condition, in which $I_2$ is the identity matrix of dimension two:

$$C^H C = \sum_{i=1}^{Q=2} |s_i|^2 I_2 \qquad (5)$$

On reception, the received signals $y_1$ and $y_2$ can be expressed in the following form, reflecting the effect of the channel on the transmission of the signals according to an Alamouti scheme, and assuming that the channel is constant over at least one OFDM symbol time:

$$\vec{y} = \begin{pmatrix} y_1 \\ y^*_2 \end{pmatrix} = \begin{pmatrix} h_1 & h_2 \\ -h^*_2 & h^*_1 \end{pmatrix} \begin{pmatrix} s_1 \\ s_2 \end{pmatrix} + \begin{pmatrix} n_1 \\ n^*_2 \end{pmatrix} = H\vec{s} + \vec{n} \qquad (6)$$

with:

$$H = \begin{pmatrix} h_1 & h_2 \\ -h^*_2 & h^*_1 \end{pmatrix}, \vec{s} = \begin{pmatrix} s_1 \\ s_2 \end{pmatrix}, \text{ and } \vec{n} = \begin{pmatrix} n_1 \\ n^*_2 \end{pmatrix}$$

where $h_i$ are the coefficients of the propagation channel and * is the "conjugate" operator.

The equations (6) satisfy the following equation:

$$HH^H = \|h\|^2 I_2 = (|h_1|^2 + |h_2|^2) I_2 \qquad (7)$$

where $^H$ is the hermitian operator.

Decoding simply consists in multiplying the received equivalent vector $\vec{y}$ by the matrix $H^H$. The output vector is written:

$$\vec{\tilde{y}} = H^H \vec{y} = H^H (H\vec{s} + \vec{n}) = \|h\|^2 \vec{s} + \vec{\tilde{n}} \qquad (8)$$

The symbols $s_1$ and $s_2$ can therefore be decoded using two threshold detectors that satisfy the optimum maximum likelihood (ML) decision criterion.

Orthogonal Frequency Division Multiplex/Offset Quadrature Amplitude Modulation (OFDM/OQAM) is an alternative to standard OFDM modulation and was introduced to avoid the loss of spectral efficiency caused by the introduction of a guard time.

To be more precise, OFDM/OQAM modulation does not require a guard time (cyclic prefix) by means of a judicious choice of the prototype function for modulating each of the signal carriers, which makes it possible to locate each of the carriers accurately in the time-frequency space. One example of a prototype function is the Iota function, described in particular in patent application FR 2 733 869, which has the feature of being identical to its Fourier transform.

To combat interference, the standard approach is to apply the Alamouti scheme to OFDM/OQAM modulation. With this type of modulation, the symbols $a_{m,n}$ transmitted on a carrier m at a time n are real symbols and the coding matrix may be expressed in the form:

$$C = \begin{pmatrix} a_{m,n} & a_{m,n+1} \\ -a_{m,n+1} & a_{m,n} \end{pmatrix} \qquad (9)$$

The above formula may be concisely expressed in the form:

$$C = \begin{pmatrix} a_1 & a_2 \\ -a_2 & a_1 \end{pmatrix} \qquad 10)$$

With OFDM/OQAM modulation, the receiver receives the symbols $a_i$ phase-shifted by the channel coefficients, to which is added the intrinsic interference $I_i$ caused by the real orthogonality. Even assuming a perfect channel estimate, it is therefore a priori impossible to recover the transmitted symbols using a single receive antenna. Ignoring noise, the symbols received after modulation on a carrier m at respective times $t'_1$ and $t'_2$ where $t'_2 = t'_1 + T$ may be expressed in the following form:

$$r_1 = h_1 a_1 + I_1(a_1) + h_2 a_2 + I_1(a_2) \qquad (11)$$

$$r_2 = h_2 a_1 + I_2(a_1) - h_1 a_2 + I_2(a_2) \qquad (12)$$

where $I_1(a_i)$ is the intrinsic interference affecting the symbol $a_i$ at time $t'_1$, which depends on the adjoining symbols on each side of the symbol $a_i$ at time $t'_1$, and where $I_2(a_i)$ is the intrinsic interference affecting the symbol $a_i$ at time $t'_2$, which depends on the adjoining symbols on each side of the symbol $a_i$ at time $t'_2$. The interference $I_i$ includes interference caused by the simultaneous transmission of signals by a plurality of antennas and therefore includes spatial interference. Despite the orthogonality (or quasi-orthogonality) that exists between a symbol and its intrinsic interference, and despite a knowledge of the channel that is assumed to be perfect, it is not possible to solve this system of equations using the same approach as for standard OFDM. This system comprises two equations in six unknowns, the two transmitted symbols $a_1$, $a_2$ and the four interference terms $I_1(a_1)$, $I_1(a_2)$, $I_2(a_1)$, $I_2(a_2)$.

In contrast to standard OFDM transmission using an Alamouti scheme, OFDM/OQAM transmission using real space-time coding generates on reception, by construction, interference relative to a transmission time that makes it impossible to process interference between two successive transmission times. As a matter of fact, assuming that $I_1(a_1)$ and $I_1(a_2)$ are respectively equal to $I_2(a_1)$ and $I_2(a_2)$ cannot be envisaged because:

the intrinsic interference $I_1(a_i)(i=1,2)$ depends on the adjacent symbols (in the time-frequency plane) on each side of the symbol $a_i$ at time $t'_1$.

the intrinsic interference $I_2(a_i)(i=1,2)$ depends on the adjacent symbols (in the time-frequency plane) on each side the symbol $a_i$ at time $t'_2$; and the neighbors of the symbol $a_i$ at time $t'_1$ are different from the neighbors of the symbol $a_i$ at time $t'_2$.

Consequently, for $i=1,2$, $I_1(a_i) \neq I_2(a_i)$.

Furthermore, simulation has verified that the variance of the intrinsic interference is equal to the variance of the real symbols. Considering all this interference as noise, the overall noise level is increased enormously, and it is not possible to obtain an acceptable bit error rate $T_{eb}$.

Consequently, with OFDM/OQAM modulation, it is not possible to use an Alamouti scheme in the transmitter to combat interference in the receiver.

SUMMARY

One object of the invention is to propose a transmission scheme for combating interference on reception in the context of OFDM/OQAM modulation for a system comprising at least two transmit antennas.

That object, together with others that become apparent below, is achieved by means of a method of transmitting a multi-carrier signal intended to be used by a system with Nt transmit antennas, where Nt is greater than or equal to two, Nr receive antennas, where Nr is greater than or equal to one, of the type employing OFDM/OQAM modulation and distributing symbols in a time-frequency plane before transmission, wherein the symbols are distributed over blocks of a particular size $n_t.n_f$ where $n_t \geq 3$ and $n_f \geq 3$. The method includes real type space-time coding by a space-time coder with a coding matrix of particular size Nt×N and of particular efficiency Nc/N to generate Nt coded sequences of N blocks of symbols of an input sequence of Nc blocks of symbols.

The invention further provides a transmitter adapted to use a transmission method of the invention. The transmitter includes a real type space-time coder with a coding matrix of particular size Nt×N and of particular efficiency Nc/N to generate Nt coded sequences of N blocks of symbols of an input sequence of Nc blocks of symbols.

Thus the method and the transmitter of the invention perform space-time coding at the level of a block of blocks of at least three symbols, in contrast to known techniques that perform space-time coding at the level of a block of symbols.

The method and the transmitter of the invention solve the stated problem. As a matter of fact, by effecting real time-space coding of a sequence of time-frequency blocks of symbols comprising at least three symbols over the time and frequency dimensions, rather than a block of two symbols, it is possible to keep the same neighbors for the symbols within a block between two successive blocks of a sequence. The symbols within a block are all the symbols distributed in the time-frequency plane of a block except for those assigned to the first and last columns of the block and those assigned to the first and last rows of the block.

For the symbols within a block, $I_1(a_1)$ and $I_1(a_2)$ are respectively equal to $I_2(a_1)$ and $I_2(a_2)$ because the neighbors of the symbol $a_i$ at time $t'_1$ are the same as the neighbors of the symbol $a_i$ at time $t'_2$; thus for $i=1,2$ $I_1(a_i)=I_2(a_i)$.

The maximum size of the blocks is that producing the lowest bit error rate. The maximum size depends on the propagation channel. To obtain correct results, the size is such that the propagation channel is invariant over a period or a bandwidth at least equal to that of a block.

In the situation of Alamouti-type space-time coding of a sequence of two blocks that are successive in time, the size of a block on the time axis is chosen so that the propagation channel is invariant over the duration of at least one block. In this situation, the size of the blocks along the time axis depends on the coherence time of the propagation channel.

In the situation of space-time coding of a sequence of two blocks that are successive in frequency, which is sometimes referred to as space-frequency coding, the size of a block along the frequency axis is chosen so that the propagation channel is invariant over the frequency bandwidth of at least one block. In this situation, the size of the blocks (their dimension along the frequency axis) depends on the coherence bandwidth of the propagation channel.

In one particular implementation of the invention, the method includes channel coding and the data to be transmitted is split into two distinct streams before channel coding (this is sometimes referred to as error correction coding). The data of each of the two streams is coded by a channel coder using a respective different efficiency code for each stream. The coder may consist of two elementary coders using the same code but associated with different puncturing between the two elementary coders. The coder may also consist of two elementary coders using different codes having a different efficiency. In this implementation the symbols are distributed over the blocks with at least the first and last OFDM symbol times of a block reserved for symbols corresponding to data previously coded using the lowest efficiency code. The symbols assigned to the edges of the blocks not having the benefit of the same neighbors after space-time coding, using a code with a lowest efficiency for these symbols makes it possible to alleviate the absence of the effect on block by block coding in accordance with the invention of time-frequency blocks for those symbols to combat the effects of interference. This implementation thus increases the efficacy of the method of the invention.

In this implementation of the invention, distributing the streams along the time axis is typically associated with space-time coding effected on a sequence of two blocks B1, B2 that are successive in time. In this situation, the size of a block along this time axis must be such that the coefficients of the propagation channel can be considered constant over at least the time duration of a block. Distributing the streams along the frequency axis is typically associated with space-time coding effected on a sequence of two blocks B1, B2 that are successive in frequency. In this situation, the size of a block along this frequency axis must be such that the coefficients of the propagation channel can be considered constant over at least the frequency band of a block.

In one particular implementation of the invention, the size of the blocks along the frequency axis is equal to the size of a block of data assigned to a user with reference to block interleaving effected upstream in the transmission subsystem, for example. If this size is equal to the number of data carriers of the OFDM modulator, this may make it possible to distribute the corresponding symbols over the whole of the frequency band and therefore to give a user the benefit of the whole of the frequency band. Accordingly, one user is not disadvantaged over other users a priori by interference in the band introduced by the propagation channel, because the symbols of one user may be distributed over the whole band. In a situation in which this size is less than the number of data carriers of the OFDM modulator, this effect may be associated with an OFDMA technique, the symbols of this user then being distributed over part of the band.

Moreover, the invention provides a reception method adapted to receive a multi-carrier signal transmitted by a transmission method of the invention. The reception method is intended to be used by a system with Nt transmit antennas, where Nt is greater than or equal to two, and Nr receive antennas, where Nr is greater than or equal to one, the system using OFDM/OQAM modulation and distributing symbols in a time-frequency plane before transmission. The reception method includes the step of space time decoding by a decoder that is the inverse of a space-time coder with an Nt×N coding matrix and efficiency Nc/N to generate Nt coded sequences of N blocks of symbols of an input sequence of Nc blocks of symbols of size $n_t.n_f$ where $n_t \geq 3$ and $n_f \geq 3$, the size $n_t.n_f$ taking account of an estimated coherence time and/or an estimated coherence bandwidth of a multi-carrier signal propagation channel to obtain estimated values of the symbols of the Nc blocks using values of the coefficients of the propagation channel of the transmitted multi-carrier signal assumed to be constant over at least the duration $n_t$ or the band $n_f$.

The invention further provides a receiver for a multi-antenna system. The receiver includes means adapted to execute a reception method of the invention. The receiver of a multi-carrier signal intended for a system with Nt transmit antennas, where Nt is greater than or equal to two, and Nr receive antennas, where Nr is greater than or equal to one, includes:
an OFDM/OQAM demodulation module;
a suitable space-time decoding module using a decoder that is the inverse of a real type space-time coder with a coding matrix of particular size Nt×N and of particular efficiency Nc/N for generating Nt coded sequences of N blocks of symbols of an input sequence of Nc blocks of symbols of size $n_t.n_f$ where $n_t \geq 3$ and $n_f \geq 3$, the size $n_t.n_f$ taking account of an estimated coherence time and/or an estimated coherence bandwidth of a propagation channel of the multi-carrier signal to obtain estimated values of the symbols of the Nc blocks using values of the coefficients of the propagation channel assumed to be constant over at least the time $n_t$ or the band $n_f$.

The invention further provides a multi-antenna system including at least one transmitter and one receiver as defined above.

In the context of the invention, the multi-antenna system is an MIMO or MISO system and has at least two transmit antennas. In the remainder of the document, a MIMO system is a system having a plurality of transmit antennas regardless of the number of receive antennas (Nr≧1).

In a preferred implementation, the steps of the transmission, respectively reception, method are determined by the instructions of a transmission program incorporated in an electronic circuit such as a microchip which itself may be part of an electronic device such as a transmitter, respectively a receiver. The transmission, respectively reception, method of the invention may equally be implemented by loading this program into a computation unit such as a processor or the like of operation that is then controlled by executing the program.

Consequently, the invention also provides a computer program, especially a computer program on or in an information medium, adapted to implement the invention. This program may use any programming language, and take the form of source code, object code, or a code intermediate between source code and object code, such as a partially-compiled form, or any other form suitable for implementing a method of the invention.

The information medium may be any entity or device capable of storing the program. For example, the medium may include storage means, such as a ROM, for example a CD ROM or a micro-electronic circuit ROM, or magnetic storage means, for example a floppy disk or a hard disk.

Alternatively, the information medium may be an integrated circuit in which the program is incorporated, the circuit being adapted to execute the method in question or to be used in its execution.

Furthermore, the program may be translated into a transmissible form such as an electrical or optical signal, which may be routed via an electrical or optical cable, by radio or by other means. The program of the invention may in particular be downloaded over an Internet-type network.

BRIEF DESCRIPTION OF THE DRAWINGS

Other features and advantages of the invention become apparent in the course of the following description given by way of non-limiting example and with reference to the appended figures.

DETAILED DESCRIPTION

Figure 3:
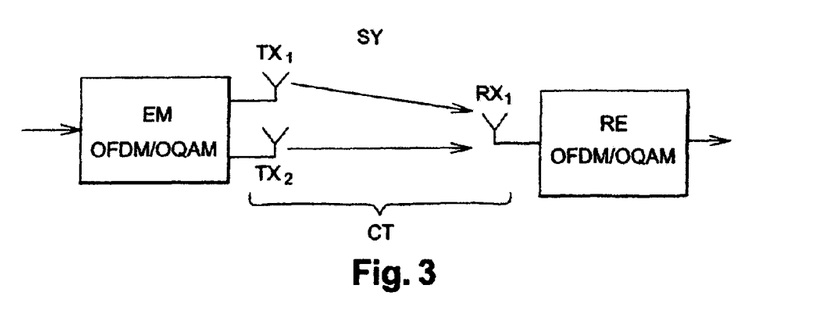
FIG. 3 is a diagram showing a particular transmission system of the invention for implementing a transmission method of the invention and a reception method of the invention.

Referring to FIG. 3, a method of the invention for transmitting a multi-carrier signal is intended to be used by a system SY with Nt transmit antennas $TX_1$ to $TX_{Nt}$, where Nt is greater than or equal to two, and Nr receive antennas $RX_1$ to $RX_{Nr}$, where Nr is greater than or equal to one, of the type using OFDM/OQAM modulation and distributing symbols to be transmitted in a time-frequency plane. The propagation channel CT transmits the symbols from the transmitter EM to the receiver RE. The propagation channel includes the transmit and receive antennas. In the example shown, Nt is equal to two and Nr is equal to one.

Figure 4:
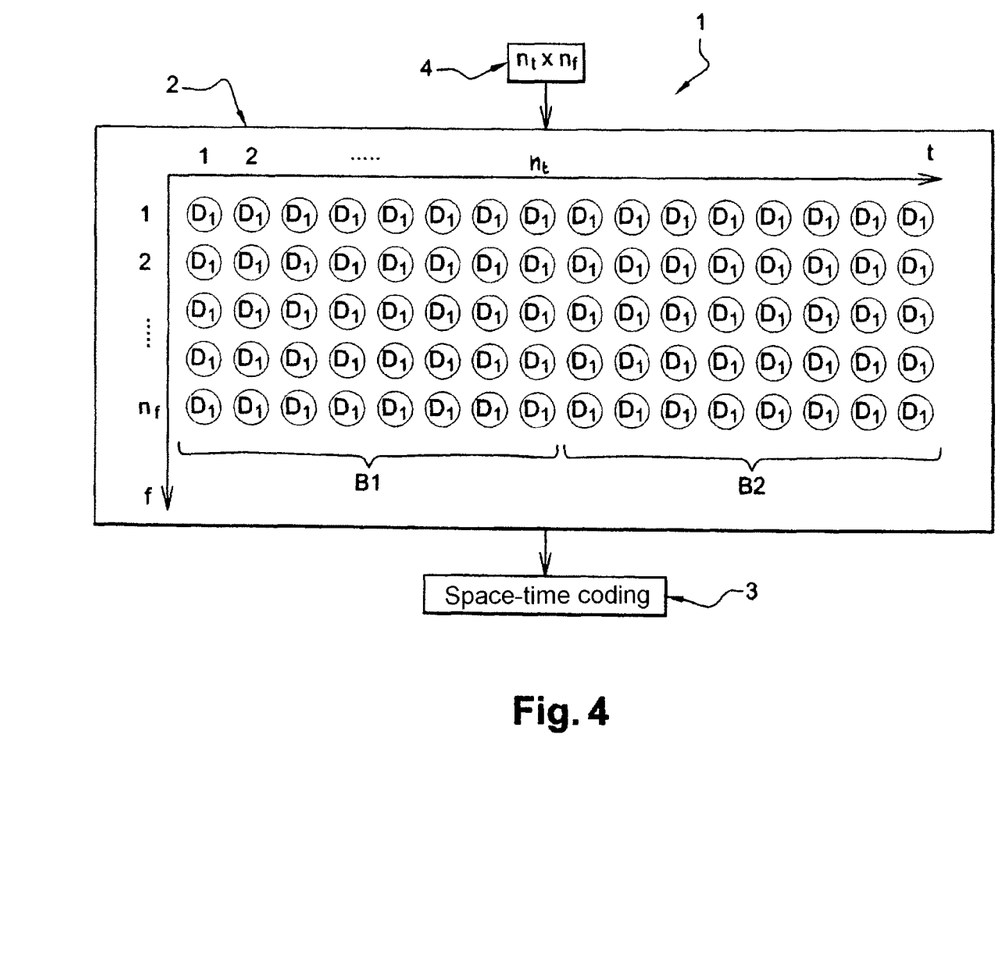
FIG. 4 is a flowchart of one implementation of a transmission method of the invention.

FIG. 4 is a flowchart of a transmission method of one implementation of the invention. The method 1 comprises:
distributing 2 symbols $D_1$ to be transmitted over blocks of particular size $n_t.n_f$ where $n_t \geqq 3$ and $n_f \geqq 3$;
real type space-time coding 3 of Nc independent blocks to determine Nt coded sequences each of length N (N successive blocks of symbols); the efficiency of the code is Nc/N and this code may be represented by an Nt×N matrix.

Determining 4 a size of $n_t.n_f$ time frequency blocks takes account of an estimated coherence time and/or an estimated coherence bandwidth of the propagation channel. The above operations do not necessarily take place sequentially and may equally well be simultaneous and possibly interleaved.

There are two types of space-time coding: a first type that corresponds to space-time coding that codes symbols taken successively in time and a second type that corresponds to space-time coding that codes symbols taken successively in frequency.

For the first type of space-time coding, the block size in time $n_t$ must correspond to at least three OFDM symbol times for there to exist symbols inside a block whose neighbors remain the same for two consecutive blocks of a coding sequence of N blocks.

For the second type of space-time coding, the block size $o_f$ along the frequency axis must correspond to at least three symbols for there to exist symbols within a block whose neighbors remain the same for two consecutive blocks of a coding sequence of N blocks.

Regardless of the type of space-time coding, each of the maximum size along the frequency axis and the maximum size along the time axis is the size that makes it possible to obtain the best performance in terms of bit error rate. For MIMO or MISO transmission the maximum size depends on the propagation channel concerned. As a matter of fact, it is assumed that over a block the propagation channel is invariant in time or in frequency as a function of the type of space-time coding. The maximum size along the frequency axis and the maximum size along the time axis therefore depend on the coherence bandwidth and the coherence time, respectively, of the propagation channel.

For Nt transmit antennas, the blocks of symbols are grouped into sequences of Nc blocks before space-time coding of efficiency Nc/N. N is the length of a coding sequence, $N \geqq Nt$, i.e. one space-time code word.

The space-time coding of a sequence of Nc blocks produces Nt×N versions coded by the "real" space-time code. Each of these sequences of length N comprises Nc independent blocks. The efficiency of this space-time code is defined by the ratio Nc/N (the number of payload blocks transmitted per unit block time, a block time being the time to transmit a block of symbols). The coded blocks are sent via each of the Nt antennas and the Nt antennas simultaneously transmit a coded block every block time.

For example, the real type space-time code may be the Alamouti code for real symbols. In a system with two transmit antennas and using an Alamouti code for real symbols, the minimum value of N is two. If N is equal to two, the following versions of the blocks are transmitted:
[B1 B2] via antenna 1
[B2 −B1] via antenna 2

If N is equal to four and using a Tarokh space-time code, the following versions of the blocks are transmitted:
[B1 B2 B3 B4] via antenna 1
[B2 −B1 B4 −B3] via antenna 2

In a system with more than two antennas, for example if Nt is equal to four (i.e. there are four antennas) and N is equal to four (i.e. there are four blocks), the following versions of the blocks are transmitted when using a Tarokh space-time code:
[B1 B2 B3 B4] via antenna 1
[−B2 B1 −B4 B3] via antenna 2
[−B3 B4 B1 −B2] via antenna 3
[−B4 −B3 B2 B1] via antenna 4

Bi means that all the symbols of the block are transmitted as they stand. Conversely, −Bi means that the opposites of all the symbols of the block are transmitted.

In one particular implementation of the invention, the method further includes:
splitting the symbols to be transmitted into two distinct streams;
channel coding upstream of space-time coding, using codes with different efficiencies for the different streams.

The criterion for splitting into two streams may be the symbol type (data symbols-control symbols), the user (user 1-user 2) or linked to the data source (source 1-source 2), which correspond for example to two different types of service for which the guaranteed quality of service (QoS) is not the same.

The method effects channel coding of these two streams using two codes with respective different efficiencies; stream two is coded with a lower efficiency than stream one. In other words, stream two is coded using a code that has a greater correction capacity than the code used for stream one.

Figure 5:
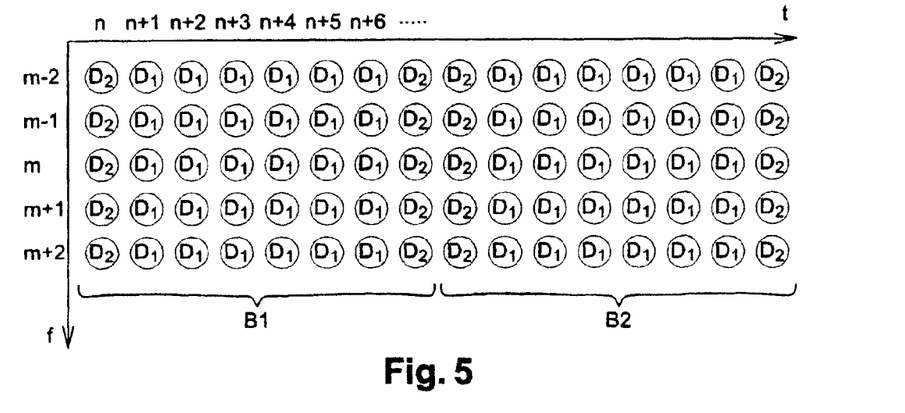
FIG. 5 illustrates, for an implementation of the invention relating to two streams of symbols, distribution of symbols in the time-frequency plane by a space-time coding scheme over two blocks that are successive in time, for example of the Alamouti type.

FIG. 5 shows one possible distribution of the symbols $D_1$, respectively $D_2$, of stream one, respectively stream two, over two successive blocks B1, B2 in the situation of space-time coding of the first type.

Figure 6:
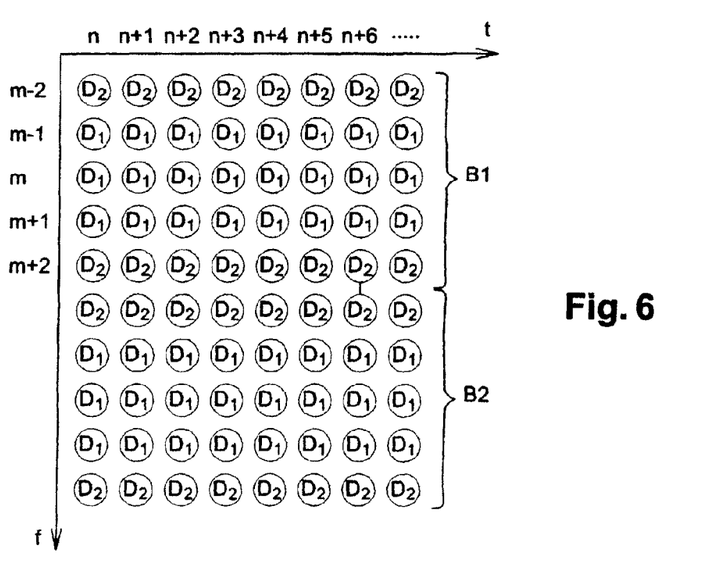
FIG. 6 illustrates, for an implementation of the invention relating to two streams of symbols, distribution of symbols in the time-frequency plane by a space-time coding scheme over two blocks that are successive in frequency.

FIG. 6 shows one possible distribution of the symbols $D_1$, respectively $D_2$, of stream one, respectively stream two, over two successive blocks B1, B2 in the situation of space-time coding of the second type.

In this implementation of the invention, the minimum block size must satisfy the following constraints:
For the first type of space-time coding, the block size must be greater than or equal to a minimum value of three symbols along the frequency axis to enable distribution of the two streams.
For the second type of space-time coding, the block size must be greater than or equal to a minimum value of three symbols along the time axis to enable distribution of the two streams.

In this implementation of the invention, for the first type of space-time coding, the symbols of the different streams are distributed between the blocks by reserving at least the first and last columns of a block for symbols of the stream for which the channel code has the lowest efficiency, as shown in FIG. 5, respectively the first and last rows of a block for the second type of space-time coding, as shown in FIG. 6.

Figure 7:
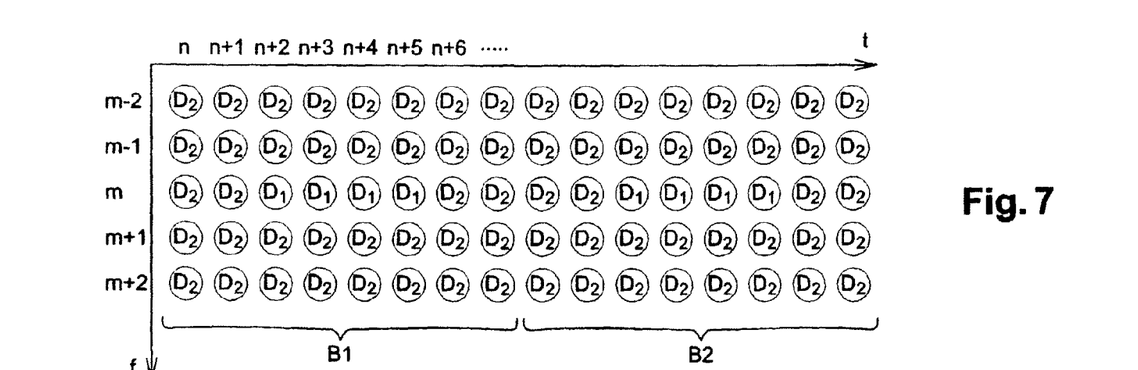
FIG. 7 illustrates, for an implementation of the invention relating to two streams of symbols, distribution of symbols in the time-frequency plane by a space-time coding scheme over two blocks that are successive in time.

In one particular implementation of the invention, the step of distributing the symbols assigns more places in the time-frequency plane to symbols of stream two. FIG. 7 illustrates this when the symbols $D_2$ of stream two are distributed over the first, second, penultimate and last sub-carriers of the block in each OFDM symbol time and over the first, second, penultimate and last OFDM symbol times of each carrier of a block.

The distribution of the number of time-frequency locations between the two streams determines the respective bit rate assigned to each stream. This therefore makes it possible to assign one of the two streams a higher bit rate.

Figure 8:
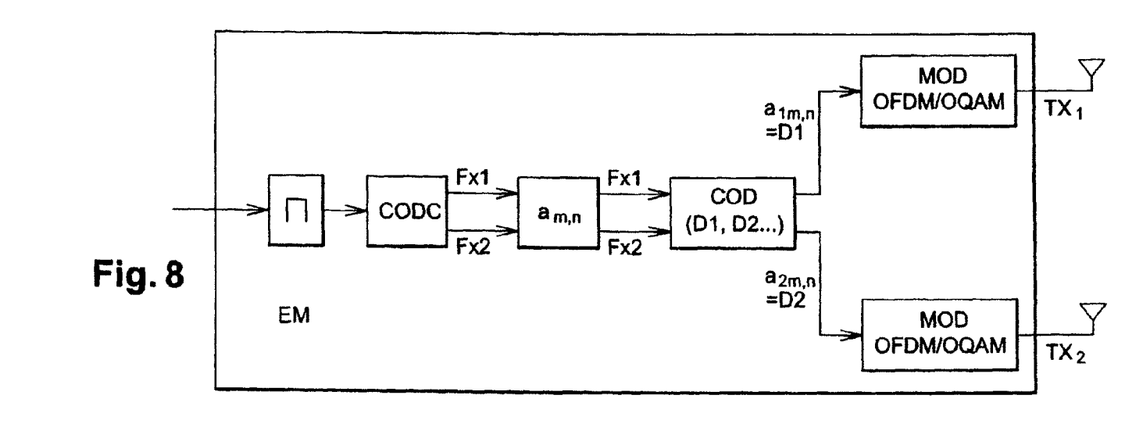
FIG. 8 is a diagram of a transmitter of one particular implementation of the invention adapted to enable the use of a transmission method of the invention.

FIG. 8 shows an example of a transmitter EM adapted to implement a transmission method of the invention.

The transmitter EM includes a binary interleaving module Π, a channel coder CODC, a transformation module for transformation into real symbols $a_{m,n}$, a space-time coder COD, and two multi-carrier modulation modules OFDM/OQAM. The transmitter EM is connected to two transmit antennas $TX_1$ and $TX_2$.

The binary interleaving module Π interleaves the input data in a manner known in the art. The channel coder CODC is adapted to distinguish two input data streams and to code the two streams with a code of different particular efficiency for each of the two streams. The converter module maps the coded bits onto data symbols $a_{m,n}$ with real values. The space-time coder COD is adapted to distribute the input data symbols in a time-frequency plane in the blocks $B_i$ of particular size $n_t.n_f$ where $n_t \geq 3$ and $n_f \geq 3$ and to code the sequences of Nc blocks to generate, for each sequence, two coded versions of the sequence, one for each transmit antenna. Before being transmitted by an antenna, a coded sequence is OFDM/OQAM modulated by a multi-carrier modulator.

Figures 9, 10:
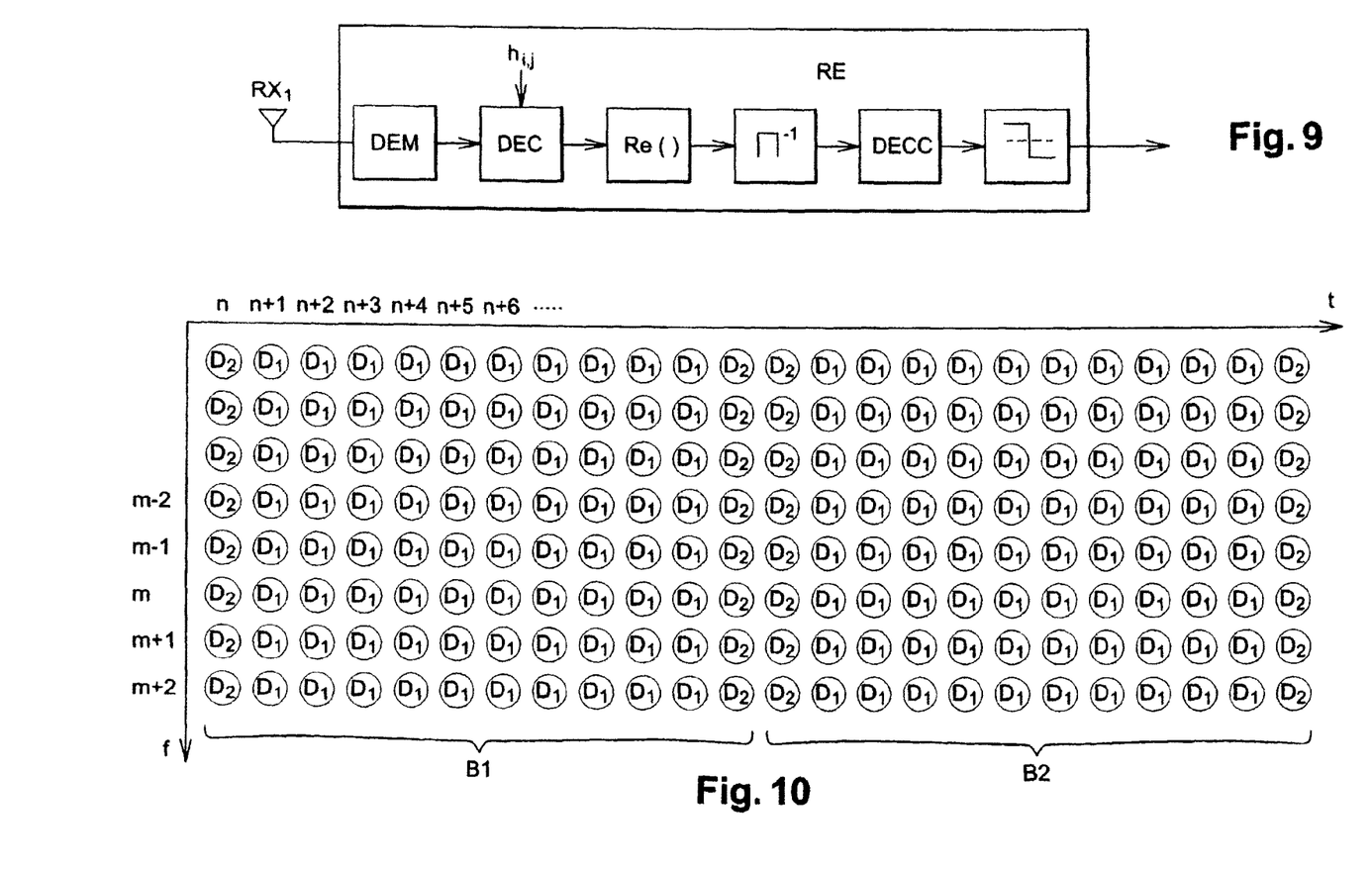
FIG. 9 is a diagram of a receiver of one particular implementation of the invention adapted to enable the use of a reception method of the invention.
FIG. 10 illustrates, for an implementation relating to two streams of symbols, distribution of symbols in the time-frequency plane effected with a space-time coding scheme over two blocks that are successive in time with a size $n_t \times n_f$ of 12×8 blocks.

FIG. 9 shows an example of a receiver RE adapted to implement a receiving method of the invention. The receiver RE is adapted to receive a signal transmitted by a transmitter of the invention.

In the figure, the receiver RE is connected to a single antenna $RX_1$. The corresponding system is thus an MISO system. The receiver RE includes at least the modules adapted to implement the functions that are the inverse of the functions used for transmission. Thus the receiver RE includes a demodulator module DEM, an equalizer and space-time decoder module DEC, a module Re for extracting the real parts of the signal, a de-interleaver module $\Pi^{-1}$, a channel decoder module DECC, and an estimator module.

The demodulator module DEM effects multi-carrier demodulation, typically by means of a Fourier transform.

The module DEC effects equalization by means of a known technique, for example a forcing to zero technique, using the coefficients $h_{ij}$ of the propagation channel. These coefficients are known, for example because a preamble or pilot signals distributed in the frame are used. This module is further adapted to perform the operation that is the inverse of the space-time coding performed by the module COD on transmission.

The module Re extracts a real part of the signals resulting from space-time decoding. The modulation employed on transmission being OFDM/OQAM modulation, only the real part contains payload information.

The module $\Pi^{-1}$ effects an operation that is the inverse of the interleaving operation performed on transmission by the interleaving module Π.

The module DECC is adapted to effect channel decoding using a function that is the inverse of that used on transmission by the channel coding module CODC.

A transmission method and a receiving method conforming to one implementation of the invention are described below with the aid of a particular example.

The system considered is of the MISO type with two transmit antennas. Channel coding codes two streams using two different code efficiencies. The block size determined in this example is $n_t.n_f=8\times12$; there are eight symbols on the frequency axis and twelve symbols on the time axis, i.e. ninety-six symbols per block. The symbols D2 of stream two are distributed along the two edges on the frequency axis of the blocks. The distribution over two successive blocks B1 and B2 is represented in FIG. 10. The space-time coding is Alamouti 2×1 coding. After space-time coding the block B1 and then the block B2 are transmitted via antenna one and simultaneously the block B2 and then the block −B1 are transmitted via antenna two.

As far as reception is concerned, the method assumes that the propagation channel is constant over at least the duration of a block.

The first system example considered is of DVB-T type:
size of FFT=2048;
number of modulated carriers=1512.

The number of blocks for the whole of the band is therefore: 1512/8=189.

The system being of the MISO type, the propagation channel includes two sub-channels, from transmit antenna one to the receive antenna and from transmit antenna two to the receive antenna. Each sub-channel is characterized by a coefficient $h_i$, i=1, 2. The receiver determines these coefficients using known techniques, typically using a preamble or pilot symbols.

The signals received by the receiver may be expressed in the following manner:

at block time $t_1$: $R1=h_1B1+h_2B2$ (13)

at block time $t_2$: $R2=h_1B2-h_2B1$ (14)

The module DEC decodes as follows in the complex domain:

estimates for the symbols of the block B1:

$B1=(h_1R1-h_2R2)/(h_1^2+h_2^2)$ (15)

estimates for the symbols of the block B2:

$B2=(h_2R1-h_1R2)/(h_1^2+h_2^2)$ (16)

Figure 11:
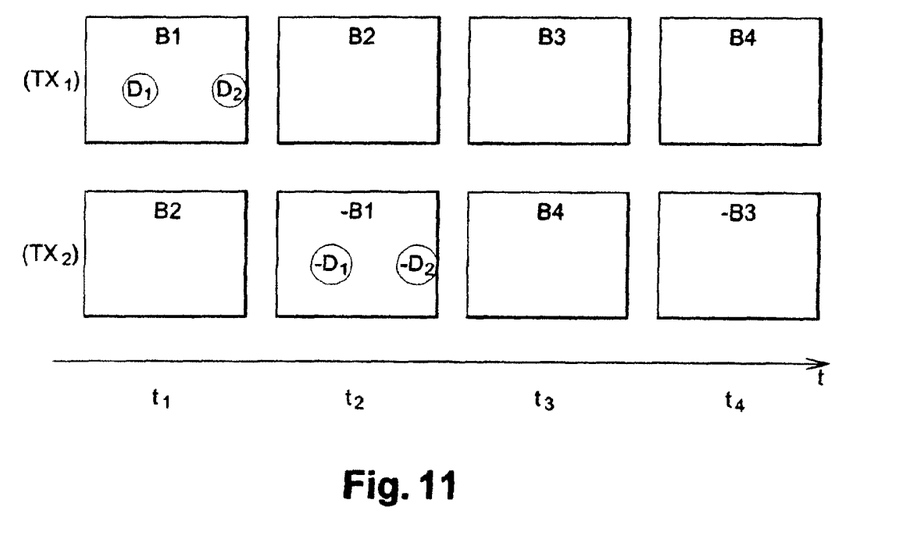
FIG. 11 illustrates, for an implementation relating to two streams of symbols, distribution of symbols $D_i$ in the time-frequency plane effected with space-time coding scheme over two blocks that are successive in time.

As shown by FIG. 11, the symbols transmitted in the vicinity of the symbols D1 of the blocks B1 and B2 (the eight symbols surrounding them in the time-frequency plane) are the same in the two blocks coming from the two transmit antennas. The intrinsic interference generated by the imaginary part is therefore the same for both coded versions of the blocks transmitted by antenna one and antenna two, respectively. These symbols are therefore decoded without skew (without additional errors caused by space-time coding/decoding).

As shown in FIG. 11, the symbols transmitted in the vicinity of the symbols D2 of the blocks B1 and B2 (the eight symbols surrounding them in the time-frequency plane) are different in the two blocks coming from the two transmit antennas because the sequence of blocks is different for each of the two antennas. An additional error therefore appears caused by this vicinity difference: the intrinsic interference is different and the calculation of B1 and B2 from expressions (15) and (16) generates a skew. To alleviate this problem, the symbols D2 are encoded independently of the symbols D1 using a more powerful error corrector code than that used to code the data D1 during channel coding.

The two streams are decoded thereafter in a similar manner to the decoding used in the situation of SISO (Single Input Single Output) OFDM/OQAM reception as in the prior art.

The following example illustrates the step of determining the size of a block.

The example assumes that the propagation channel is of Vehicular Channel A type with the mobile moving at a speed of 60 kph. This channel induces a spread Tmax of the echoes of 2.5 μs. The example further assumes that the signal carrier frequency is 2.5 GHz (this assumption is commonly used for systems rated in the context of 3GPP LTE standardization). For a speed of 60 kph (16.67 m/s), this gives a Doppler frequency of 140 Hz.

The coherence time linked to this Doppler frequency is 1/(2·Fd)=1/280=3.5 ms.

The coherence bandwidth linked to the spreading of the echoes is 1/(2Tmax)=1/5 µs=200 kHz.

In a 3GPP LTE type system, assuming a usable transmission band of 20 MHz, the parameters are as follows:
Sampling frequency $F_s$=30.72 MHz
Number of sub-carriers over the total band Fs: FFT=2048
Knowing that the number of usable sub-carriers at 20 MHz is approximately 2/3*FFT, then:
OFDM/OQAM symbol time=FFT/Fs*1/2=33.33 µs
Sub-carrier bandwidth=15 kHz
Maximum block size relative to the coherence time and the coherence bandwidth:
coherence time=105 OFD/OQAM symbols;
coherence bandwidth=frequencies of 13 sub-carriers.

The channel is considered substantially constant over the coherence bandwidth and the coherence time. Taking blocks of 1/4 the coherence time or 1/2 the coherence bandwidth, it is therefore reasonable to consider that the channel is constant over one block in time or in frequency.

In the present example, this yields:
Blocks of 26 symbols in time for space-time coding with symbols that are successive in time. The proportion of data D2 to be protected by a more powerful error correcting code is therefore 2/26~7.6% using a distribution of the symbols D2 over only the outside two columns of a block.
Blocks of 7 symbols in frequency for space-time coding with symbols that are successive in frequency. The proportion of data D2 to be protected by a more powerful error correcting code is therefore 2/7~28.6% using a distribution of the symbols D2 over only the outside two rows of a block.

The second system example is of DVB-T2 type, with a 10 MHz propagation channel. Some parameters change compared to a DVB-T type system. In particular:
Sampling frequency Fs=15.36 MHz.
The OFDM/OQAM symbol time becomes FFT/Fs*1/2=66.67 µs. The bandwidth of a sub-carrier becomes 7.5 kHz. The coherence time becomes 53 OFDM/OQAM symbols. The coherence bandwidth becomes the frequencies of 27 sub-carriers.

The channel is considered substantially constant over the coherence bandwidth and the coherence time. Taking blocks of 1/4 the coherence time or 1/2 the coherence bandwidth, it is therefore reasonable to consider that the channel is constant in time or in frequency over one block.

In the present example, this yields:
Blocks of 26 symbols in time for space-time coding with symbols that are successive in time. The proportion of data D2 to be protected by a more powerful error correcting code is therefore 2/13~15.4% using a distribution of the symbols D2 over only the outside two columns of a block.
Blocks of 7 symbols in frequency for space-time coding with symbols that are successive in frequency. The proportion of data D2 to be protected by a more powerful error correcting code is therefore 2/13~15.4% using a distribution of the symbols D2 over only the outside two rows of a block.

The invention claimed is:

1. A method for transmitting a multi-carrier signal intended to be used by a system:
with Nt transmit antennas, where Nt is greater than or equal to two,
with Nr receive antennas where Nr is greater than or equal to one,
of the type employing OFDM/OQAM modulation and distributing symbols in a time-frequency plane before transmission,
wherein the symbols are distributed over blocks of a particular size $n_t.n_f$ where $n_t \geq 3$ and $n_f \geq 3$ and
the method comprising
real type space-time coding of sequences of blocks of size $n_t.n_f$ by a space-time coder with a coding matrix of particular size Nt×N and of particular efficiency Nc/N to generate Nt coded sequences of N blocks of symbols of an input sequence of Nc blocks of symbols; and
before space-time coding, of channel coding two streams with a code of different particular efficiency different for each of the streams and wherein the symbols are distributed over blocks of size $n_t.n_f$ by reserving at least some time-frequency locations at the edges of a block for symbols of the stream coded using the lowest efficiency code.

2. The method according to claim 1 of transmitting a multi-carrier signal, wherein the space-time coding is of the type coding blocks of symbols distributed successively in time for a given stream and wherein the reserved locations constitute columns of a block.

3. The method according to claim 1 of transmitting a multi-carrier signal, wherein the space-time coding is of the type coding blocks of symbols distributed successively in frequency for a given stream and wherein the reserved locations constitute rows of a block.

4. The method according to claim 1 of transmitting a multi-carrier signal, wherein the number of locations reserved for symbols of the stream coded using the lowest efficiency code is greater than the number of locations remaining for symbols of the stream coded using the highest efficiency code.

5. A method of receiving of a multi-carrier signal intended to be used by a system with Nt transmit antennas, where Nt is greater than or equal to two, and Nr receive antennas where Nr is greater than or equal to one, the system employing OFDM/OQAM modulation and distributing symbols in a time-frequency plane before transmission, the method comprising the step of space-time decoding by a decoder that is the inverse of a space-time coder with a coding matrix of particular size Nt×N and of particular efficiency Nc/N for generating Nt coded sequences of N blocks of symbols of an input sequence of Nc blocks of symbols of size $n_t.n_f$ where $n_t \geq 3$ and $n_f \geq 3$, the size $n_t.n_f$ taking account of an estimated coherence time and an estimated coherence bandwidth of a propagation channel of the multi-carrier signal to obtain estimated values of the symbols of the Nc blocks using values of the coefficients of the propagation channel of the transmitted multi-carrier signal that are assumed to be constant over at least the time $n_t$ or the band $n_f$.

6. A receiver of a multi-carrier signal intended for a system with Nt transmit antennas, where Nt is greater than or equal to two, and Nr receive antennas where Nr is greater than or equal to one, comprising:
an OFDM/OQAM demodulation module;
a suitable space-time decoding module using a decoder that is the inverse of a real type space-time coder with a coding matrix of particular size Nt×N and of particular efficiency Nc/N for generating Nt coded sequences of N blocks of symbols of an input sequence of Nc blocks of symbols of size $n_t.n_f$ where $n_t \geq 3$ and $n_f \geq 3$, the size $n_t.n_f$ taking account of an estimated coherence time and an estimated coherence bandwidth of a propagation channel of the multi-carrier signal to obtain estimated values of the symbols of the Nc blocks using values of the coefficients of the propagation channel that are assumed constant over at least the time $n_t$ or the band $n_f$.

7. A transmitter of a multi-carrier signal intended for a system with Nt transmit antennas, where Nt is greater than or equal to two, and Nr receive antennas where Nr is greater than or equal to one, of the type employing OFDM/OQAM modulation and distributing symbols in a time-frequency plane before transmission, comprising:
   a channel coder to code two streams with a code of different particular efficiency different for each of the streams,
   a real type space-time coder with a coding matrix of particular size Nt×N and a determined code rate Nc/N adapted to distribute symbols after channel coding over blocks of particular size $n_t.n_f$ where $n_t \geq 3$ and $n_f \geq 3$ by reserving at least some time-frequency locations at the edges of a block for symbols of the stream coded using the lowest efficiency code and to generate Nt coded sequences of N blocks of symbols of an input sequence of Nc blocks of distributed symbols, $N \geq Nt$.

8. A non-transitory information medium having stored thereon a computer program comprising program instructions adapted to execute a transmission method according to claim 1 when said program is loaded into and executed in a transmitter.

9. A non-transitory information medium having stored thereon a computer program comprising program instructions adapted to execute a reception method according to claim 5 when said program is loaded into and executed in a receiver.

10. A method for transmitting a multi-carrier signal intended to be used by a system:
   with Nt transmit antennas, where Nt is greater than or equal to two,
   Nr receive antennas where Nr is greater than or equal to one,
   of the type employing OFDM/OQAM modulation and distributing symbols in a time-frequency plane before transmission,
the method comprising:
   channel coding two streams with a code of different particular efficiency different for each of the streams,
   distributing the symbols after channel coding over blocks of size $n_t.n_f$ by reserving at least some time-frequency locations at the edges of a block for symbols of the stream coded using the lowest efficiency code, and real type space-time coding of an input sequence of Nc blocks of distributed symbols of size $n_t.n_f$ by a space-time coder with a coding matrix of determined size Nt×N and of determined efficiency Nc/N to generate Nt coded sequences of N blocks of symbols, $N \geq Nt$.

11. A multi-antenna system, comprising a transmitter according to claim 7 and a receiver of a multi-carrier signal intended for a system with Nt transmit antennas, where Nt is greater than or equal to two, and Nr receive antennas where Nr is greater than or equal to one, comprising:
   an OFDM/OQAM demodulation module;
   a suitable space-time decoding module using a decoder that is the inverse of a real type space-time coder with a coding matrix of particular size Nt×N and of particular efficiency Nc/N for generating Nt coded sequences of N blocks of symbols of an input sequence of Nc blocks of symbols of size $n_t.n_f$ where $n_t > 3$ and $n_f > 3$, the size $n_t.n_f$ taking account of an estimated coherence time and an estimated coherence bandwidth of a propagation channel of the multi-carrier signal to obtain estimated values of the symbols of the Nc blocks using values of the coefficients of the propagation channel that are assumed constant over at least the time $n_t$ or the band $n_f$.

12. The method according to claim 10 of transmitting a multi-carrier signal, further comprising determining a time-frequency block size $n_t.n_f$ taking account of at least one of an estimated coherence time and an estimated coherence bandwidth of the multi-carrier signal propagation channel.

13. The method according to claim 10 of transmitting a multi-carrier signal, wherein the space-time coding is of the type coding blocks of symbols distributed successively in time for a given stream and wherein the reserved locations constitute columns of a block.

14. The method according to claim 10 of transmitting a multi-carrier signal, wherein the space-time coding is of the type coding blocks of symbols distributed successively in frequency for a given stream and wherein the reserved locations constitute rows of a block.

15. The method according to claim 10 of transmitting a multi-carrier signal, wherein the number of locations reserved for symbols of the stream coded using the lowest efficiency code is greater than the number of locations remaining for symbols of the stream coded using the highest efficiency code.

16. The transmitter according to claim 7 of multi-carrier signals further comprising a module adapted to determine a time-frequency block size $n_t.n_f$ taking account of at least one of an estimated coherence time and an estimated coherence bandwidth of a propagation channel of the multi-carrier signal.

* * * * *